United States Patent
Ogura (10) Patent No.: US 9,671,682 B2
(45) Date of Patent: Jun. 6, 2017

(54) LIGHT SOURCE APPARATUS AND PROJECTOR USING THE SAME

(71) Applicant: CASIO COMPUTER CO., LTD., Shibuya-ku, Tokyo (JP)

(72) Inventor: Naotsugu Ogura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/834,193

(22) Filed: Aug. 24, 2015

(65) Prior Publication Data

US 2016/0062222 A1 Mar. 3, 2016

(30) Foreign Application Priority Data

Aug. 27, 2014 (JP) ................... 2014-172789

(51) Int. Cl.
 *G03B 21/20* (2006.01)
 *H04N 9/31* (2006.01)

(52) U.S. Cl.
 CPC ......... *G03B 21/204* (2013.01); *H04N 9/3144* (2013.01); *H04N 9/3158* (2013.01)

(58) Field of Classification Search
 CPC G03B 21/204; G03B 21/208; G03B 21/2033; G03B 21/2053
 See application file for complete search history.

(56) References Cited

U.S. PATENT DOCUMENTS

| | | | | |
|---|---|---|---|---|
| 5,875,013 A | * | 2/1999 | Hiroshi | ................. G02F 1/1335 349/110 |
| 7,691,765 B2 | | 4/2010 | Suzuki et al. | |
| 8,308,306 B2 | | 11/2012 | Miyazaki et al. | |
| 8,646,919 B2 | | 2/2014 | Miyazaki et al. | |
| 9,357,187 B2 | * | 5/2016 | Katou | .................... G03B 21/14 |
| 2012/0154767 A1 | * | 6/2012 | Kimura | .................. H04N 9/315 353/98 |
| 2013/0135593 A1 | * | 5/2013 | Saitou | .................. G03B 21/204 353/31 |

(Continued)

FOREIGN PATENT DOCUMENTS

| | | |
|---|---|---|
| CN | 203324637 U | 12/2013 |
| JP | 2006282447 A | 10/2006 |
| JP | 2011013316 A | 1/2011 |

OTHER PUBLICATIONS

Chinese Office Action (and English translation thereof) dated Oct. 9, 2016, issued in counterpart Chinese Application No. 201510535259.0.

*Primary Examiner* — Sultan Chowdhury
(74) *Attorney, Agent, or Firm* — Holtz, Holtz & Volek PC (57) ABSTRACT

An excitation light source is configured to emit excitation light. A fluorescent substance plate is configured to be excited by the excitation light and to emit fluorescent substance light having a wavelength different from a wavelength of the excitation light. A condensing optical system is configured to condense the excitation light emitted from the excitation light source to an excitation light irradiation region that is smaller than the fluorescent substance plate, to apply the excitation light to the fluorescent substance plate, and to take in fluorescent substance emission light from the excitation light irradiation region. The excitation light is applied to the fluorescent substance plate such that the excitation light irradiation region is eccentric to the fluorescent substance plate.

11 Claims, 5 Drawing Sheets

(56) References Cited

U.S. PATENT DOCUMENTS

2013/0250546 A1\* 9/2013 Hu .......................... F21V 9/08
  362/84
2015/0029466 A1\* 1/2015 Sakata ................. H01S 5/1092
  353/31

\* cited by examiner

LIGHT SOURCE APPARATUS AND PROJECTOR USING THE SAME

CROSS-REFERENCE TO RELATED APPLICATIONS

This application is based upon and claims the benefit of priority from prior Japanese Patent Application No. 2014-172789, filed Aug. 27, 2014, the entire contents of which are incorporated herein by reference.

BACKGROUND OF THE INVENTION

1. Field of the Invention

The present invention relates to a light source apparatus and a projector using the same.

2. Description of the Related Art

Light source apparatuses are being used as light sources of various apparatuses such as illumination apparatuses and image projectors. Such light source apparatuses use fluorescent substance. The fluorescent substance absorbs (is excited by) excitation light emitted from an excitation light source to emit light of a wavelength different from the wavelength of the excitation light. Generally, light emitting diodes (LED) and laser diodes serving as semiconductor light sources are widely used as the light sources of such light source apparatuses. The fluorescent substance is dispersed into a transparent silicone resin layer or an epoxy resin layer to be formed as a light emitting layer.

However, a resin binder used for a light-emitting layer deteriorates due to excitation light from the semiconductor light source, or is broken when the excitation light has particularly high intensity. In addition, low thermal conductivity of resin causes an increase in temperature of the fluorescent substance dispersed into the resin, and the increase in temperature causes a phenomenon such as shift in wavelength of the light emitted from the fluorescent substance, or temperature quenching that decreases the light emission intensity, and consequently causes the problem of decrease in brightness of the light source apparatus.

To reduce such damage and effects caused by heat, known is a method of arranging fluorescent substance in a large area to prevent continuous application of excitation light to the same part. For example, as disclosed in Jpn. Pat. Appln. KOKAI Pub. No. 2011-13316, a resin binder containing fluorescent substance is concentrically applied onto the surface of a disk, to rotate the disk by a motor or the like in use.

However, this method produces a structure in which a fluorescent substance-containing resin layer continues in the rotational direction of the disk. Consequently, light emitted from the fluorescent substance is reflected and transmitted inside the fluorescent substance-containing resin layer, and light is emitted outside the range of a condensing lens that is positioned to condense light emitted from fluorescent substance. This phenomenon obstructs effective use of light emitted from fluorescent substance, and wastes the light.

In recent years, as means for improving heat resistance of light emitting layers including dispersed fluorescent substance, it is presented to use a translucent inorganic material such as glass, instead of a transparent resin binder, or use ceramics having high thermal conductivity as disclosed in Jpn. Pat. Appln. KOKAI Pub. No. 2006-282447, to form light emitting layers (such light emitting layers will be referred to as fluorescent substance plates hereinafter). In particular, fluorescent substance plates using a translucent ceramics binder have thermal conductivity dozens to hundreds of times higher than the thermal conductivity of light emitting layers using a conventional resin binder, and have markedly improved heat dissipation.

Figure 8A:
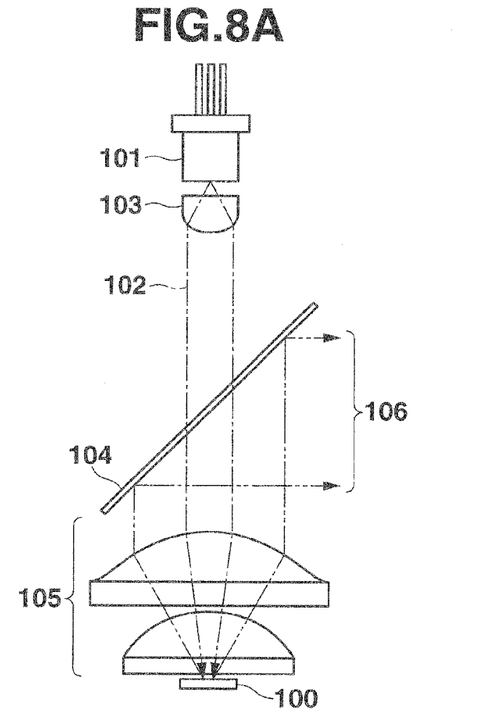
FIG. 8A is a diagram illustrating an outline of an excitation optical structure supposed in the case of applying a fluorescent substance plate using a translucent ceramics binder to a light source apparatus.

FIG. 8A is a diagram illustrating an outline of an excitation optical structure that is supposed in the case of applying a fluorescent substance plate 100 using a translucent ceramics binder to a light source apparatus. Excitation light 102 from an excitation light source 101 such as a semiconductor laser passes through a collimator lens 103, and a dichroic mirror 104 that transmits the wavelength of the excitation light 102, and is condensed to a desired size of irradiation range of the fluorescent substance plate 100 by a condensing lens group 105. The fluorescent substance emission light emitted from the fluorescent substance plate 100 is condensed by the condensing lens group 105 to the dichroic mirror 104 as fluorescent substance effective emission light 106. Light of a desired wavelength band is taken out by the dichroic mirror 104, and used as illumination light.

Figure 8B:
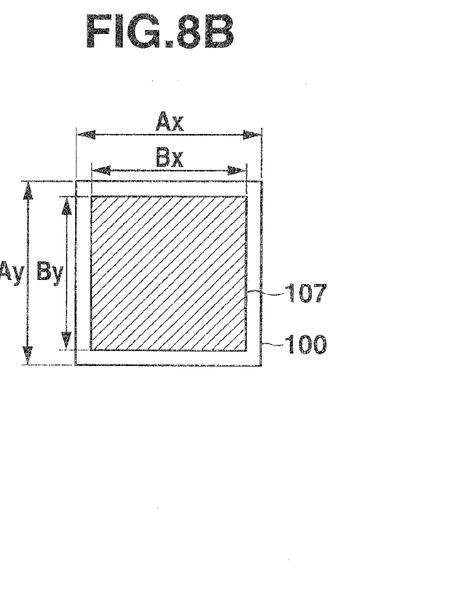
FIG. 8B is a diagram illustrating an excitation light irradiation region for the fluorescent substance plate.

FIG. 8B is a diagram illustrating an excitation light irradiation region 107 serving as an irradiation range of the excitation light 102 for the fluorescent substance plate 100. In the present specification, the excitation light irradiation range 107 indicates a range in which the energy intensity of the excitation light 102 is 10% (to 20%) or more of the maximum intensity thereof.

The fluorescent substance plate 100 is formed to have a rectangular shape having side lengths of Ax and Ay. The optical system is designed such that the excitation light irradiation range 107 serves as a rectangular region on the rectangular fluorescent substance plate 100 and side lengths Ex and By of the excitation light irradiation region 107 are slightly smaller than the side length Ax and Ay, respectively, of the fluorescent substance plate 100. Specifically, the condensing lens group 105 condenses the excitation light 102 from the excitation light source 101 to the excitation light irradiation region 107 of the fluorescent substance plate 100. The condensing lens group 105 is designed to take in the fluorescent substance emission light from the excitation light irradiation region 107 to a desired angle to be used as fluorescent substance effective emission light 106.

A light source having a smaller light emission size is more preferable, and the lengths Bx and By of the excitation light irradiation region 107 should be smaller to improve the optical efficiency. However, the fluorescent substance plate 100 to match them has a finer size, and becomes difficult to manufacture in terms of handling in mounting, and incurs an increase in cost.

Figure 8C:
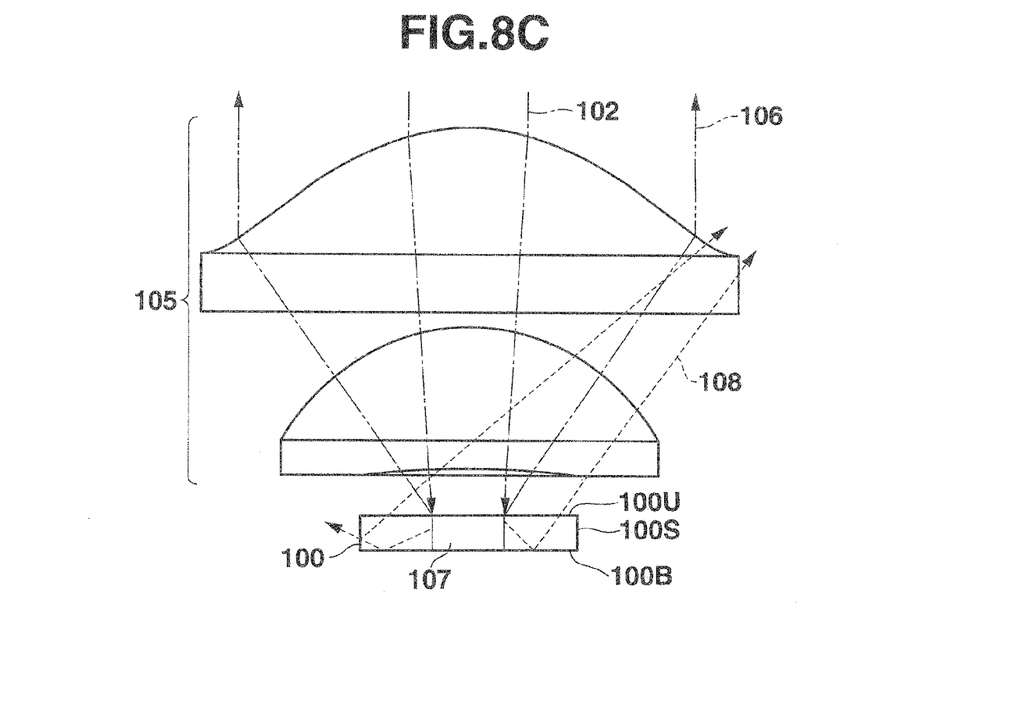
FIG. 8C is a diagram illustrating an outgoing path of fluorescent light.

For this reason, the lengths Ax an Ay of the fluorescent substance plate 100 should be set sufficiently larger than the lengths Bx and By of the excitation light irradiation region 107. In the case of increasing the lengths Ax and Ay of the fluorescent substance plate 100 as described above, because fluorescent substance emission light is emitted in all directions from activated elements that emit light inside the fluorescent substance, the fluorescent substance emission light is emitted from a position of a fluorescent substance plate upper surface 100U that is widely distant from the excitation light irradiation region 107, as illustrated in FIG. 8O. Specifically, because the fluorescent substance plate 100 is generally placed on a substrate (not illustrated), a fluorescent substance plate bottom surface 100B has an optical total reflection property, and fluorescent substance plate side surfaces 100S serving as cut portions have such total reflection property to a certain degree. With this structure, the fluorescent substance emission light that is emitted from the excitation light irradiation region 107 in all directions is transmitted through the inside of the fluorescent substance plate 100, totally reflected by the fluorescent substance plate bottom surface 100B or the fluorescent substance plate side surfaces 100S, and easily outgoes from the position of the fluorescent substance plate upper surface 100U that is widely distant from the excitation light irradiation region 107. The emission light that outgoes from the position that is widely distant from the excitation light irradiation region 107 serves as fluorescent substance ineffective emission light 108 existing outside the taking range of the condensing lens group 105, and is not effectively used. Otherwise, the reflection optical path of the emitted light inside the fluorescent substance plate 100 becomes long, and the emitted light is self-absorbed into the activated elements, to cause the phenomenon of loss of the emitted light.

An object of the present invention is to provide a light source apparatus capable of reducing loss of emitted light, and a projector using the same.

SUMMARY OF THE INVENTION

According to an aspect of the present invention, there is provided a light source apparatus including:

an excitation light source configured to emit excitation light;

a fluorescent substance plate configured to be excited by the excitation light, and to emit fluorescent substance light having a wavelength different from a wavelength of the excitation light; and a condensing optical system configured to condense the excitation light emitted from the excitation light source to an excitation light irradiation region that is smaller than the fluorescent substance plate, to apply the excitation light to the fluorescent substance plate, and to take in fluorescent substance emission light from the excitation light irradiation region, wherein the excitation light is applied to the fluorescent substance plate such that the excitation light irradiation region is eccentric to the fluorescent substance plate.

DETAILED DESCRIPTION OF THE PREFERRED EMBODIMENT

Preferred embodiments for carrying out the present invention will be explained hereinafter with reference to drawings. Although the embodiments described hereinafter include various restrictions that are technically preferable for carrying out the present invention, the scope of the invention is not limited to the following embodiments or examples illustrated in the drawings.

First Embodiment

A first embodiment will be explained hereinafter with reference to drawings.

Before explanation of a light source apparatus according to the first embodiment of the present invention, a projector according to the first embodiment of the present invention will be explained first, to which the light source apparatus is applied.

The projector projects an image based on image data that is output from an image output apparatus such as a personal computer (PC) on a projection object such as a screen. The following explanation illustrates an example of a projector using Digital Light Processing (DLP®) using a micro mirror display element as an output display element.

Figure 1A:
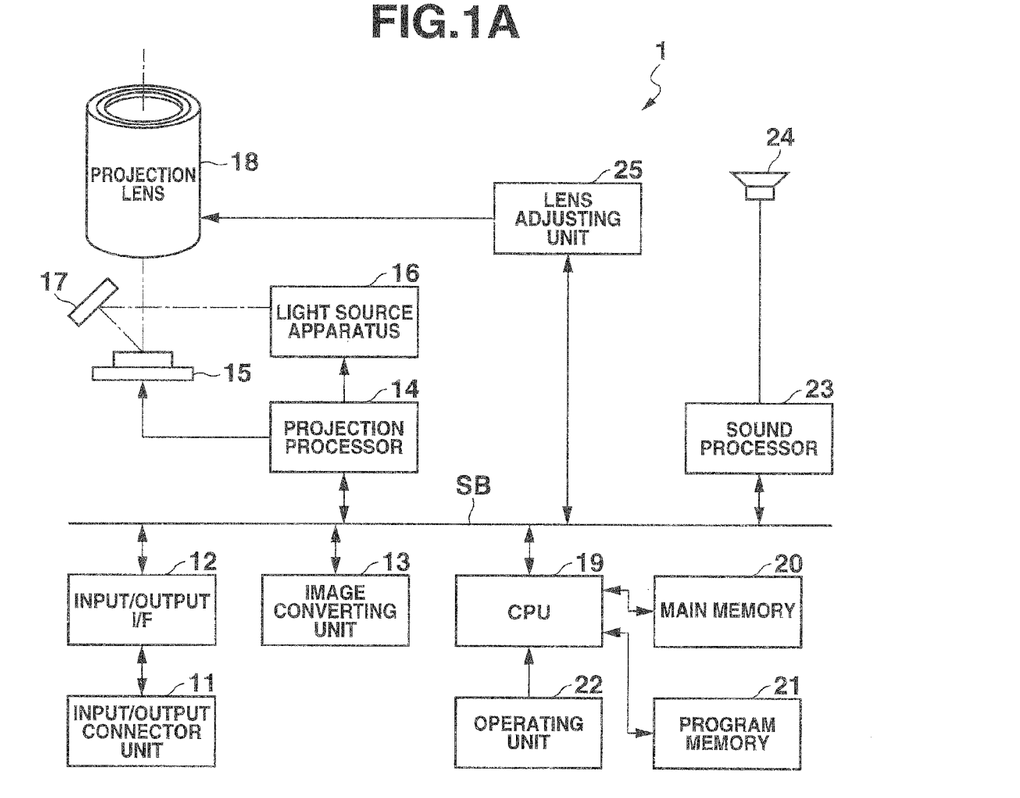
FIG. 1A is a block diagram illustrating a configuration example of a projector according to a first embodiment of the present invention.

As illustrated in FIG. 1A, a projector 1 according to the present embodiment includes an input/output connector unit 11, an input/output interface (I/F) 12, an image converting unit 13, a projection processor 14, a micro mirror element 15, a light source apparatus 16 according to the first embodiment, a mirror 17, a projection lens 18, a CPU 19, a main memory 20, a program memory 21, an operating unit 22, a sound processor 23, a speaker 24, a lens adjusting unit 25, and a system bus SB.

The input/output connector unit 11 is provided with a terminal such as a video input terminal of a pin jack (RCA) type and an RGB input terminal of a D-sub 15 type. The input/output connector unit 11 receives an analog image signal from the image output apparatus. The received analog image signal is input to the image converting unit 13 via the input/output I/F 12 and the system bus SB. The image converting unit 13 converts the input analog image signal of various standards into a digital image signal. The input/output connector unit 11 may be provided with, for example, an HDMI® terminal, to receive a digital image signal as well as an analog image signal. The input/output connector unit 11 also receives a sound signal with an analog or digital signal. The received sound signal is input to the sound processor 23 via the input/output I/F 12 and the system bus SB. The input/output connector unit 11 is also provided with, for example, an RS232C terminal and a USB terminal.

The image converting unit 13 is also referred as a scaler. The image converting unit 13 performs conversion to adjust the resolution and the gradation number on the input image data, to generate image data of a predetermined format suitable for projection. The image converting unit 13 transmits the converted image data to the projection processor 14. If necessary, the image converting unit 13 transmits image data on which symbols indicating various operation states for On Screen Display (OSD) are superimposed, as processed image data, to the projection processor 14. The image converting unit 13 also performs geometric transformation on the projection image, if necessary, and therefore performs distortion correction such that the image is projected with a proper shape on the projection object such as the screen according to the projection state.

The light source apparatus 16 emits light of a plurality of colors including light of primary colors of red (R), green (G), and blue (B). The light source apparatus 16 is configured to successively emit light of a plurality of colors in a time division manner. The light emitted from the light source apparatus 16 is totally reflected by the mirror 17, and made incident on the micro mirror element 15.

The micro mirror element 15 includes a plurality of minute mirrors that are arranged in an array. Each of the minute mirrors is turned on and off at high speed, to reflect light applied from the light source apparatus 16 toward the projection lens 18, or deflect the light from the projection lens 18. In the micro mirror element 15, minute mirrors are arranged in a number corresponding to, for example, 1600 (vertical)×900 (horizontal) pixels referred to as HD+ or WXGA++. The micro mirror element 15 forms an image of, for example, HD+ resolution, by reflection by the minute mirrors. As described above, the micro mirror element 15 functions as a spatial optical modulation element.

The projection processor 14 drives the micro mirror element 15, to cause an image indicated by image data to be displayed, in accordance with image data transmitted from the image converting unit 13. Specifically, the projection processor 14 turns on and off each of the minute mirrors of the micro mirror element 15. The projection processor 14 drives the micro mirror element 15 in a time division manner at high speed. The number of divisions of the unit time is a number obtained by multiplying the frame rate according to the predetermined format, such as 60 [frames/second], the number of divisions of the color components, and the number of display gradations. The projection processor 14 also controls operations of the light source apparatus 16 in synchronization with the operations of the micro mirror element 15. Specifically, the projection processor 14 divides each of the frames in a time division manner, to control the operation of the light source apparatus 16 to successively emit light of all color components for each frame.

The projection lens 18 adjusts the light guided from the micro mirror element 15 to light to be projected on the projection object such as the screen. Therefore, an optical image formed of light reflected by the micro mirror element 15 is projected and displayed on the projection object through the projection lens 18. The projection lens 18 has a zoom function, and therefore has a function of changing the size of the projected image. The projection lens 18 also has a focusing function to adjust a focus state of the projection image. As described above, the projection processor 14, the micro mirror element 15, the light source apparatus 16, and the projection lens 18 function as a projection unit that projects an image.

The sound processor 23 includes a sound source circuit such as a PCM sound source. The sound processor 23 drives the speaker 24 to amplify and output sound, based on analog sound data that is input from the input/output connector unit 11, or a signal obtained by converting digital sound data provided in the projecting operation into an analog signal. The sound processor 23 also generates a beep or the like, if necessary. The speaker 24 is a general speaker that outputs sound based on a signal that is input from the sound processor 23.

The CPU 19 controls operations of the image converting unit 13, the projection processor 14, the sound processor 23, and the lens adjusting unit 25. The CPU 19 is connected with the main memory 20 and the program memory 21. The main memory 20 is formed of, for example, an SRAM. The main memory 20 functions as a work memory of the CPU 19. The program memory 21 is formed of a nonvolatile memory that is electrically rewritable. The program memory 21 stores operation programs executed by the CPU 19 and various fixed form data. The CPU 19 is also connected with the operating unit 22. The operating unit 22 includes a key operating unit provided in the main body of the projector 1, and an infrared light receiver that receives infrared light from a remote controller (not illustrated) only for the projector. The operating unit 22 outputs a key operating signal based on the key operated by the user with the key operating unit of the main body or the remote controller to the CPU 19. The CPU 19 controls operations of the units of the projector 1, in accordance with the user's instructions from the operating unit 22, using the programs or data stored in the main memory 20 and the program memory 21.

The lens adjusting unit 25 drives the zoom function of the projection lens 18 under the control of the CPU 19, in accordance with a zoom change instruction issued by the user's operation of the operating unit 22. As a result of driving the zoom mechanism by the lens adjusting unit 25, the size of the projection image is changed. The lens adjusting unit 25 also drives the focus lens of the projection lens 18 in accordance with the instruction from the CPU 19.

In the projector 1 having the above structure, the projection processor 14 performs projection operation under the control of the CPU 19. In the projection operation, the projection processor 14 controls the operation of the light source apparatus 16. The projection processor 14 turns on and off each of the LDs or LEDs that emit respective colors in the light source apparatus 16 or changes a combination of the light sources and the fluorescent substance, to cause the light source apparatus 16 to successively emit light of, for example, three colors of red light (R), green light (G), and blue light (B). The projection processor 14 causes the red light, the green light, and the blue light to be successively made incident on the micro mirror element 15 from the light source apparatus 16.

The micro mirror element 15 increases the time for guiding the incident light to the projection lens 18 as the gradation based on the image data increases, and decreases the time for guiding the incident light to the projection lens 18 as the gradation decreases, for each of the minute mirrors (each of the pixels) for light of each color. Specifically, the projection processor 14 controls the micro mirror element 15 such that the minute mirror corresponding to the pixel of a high gradation is kept turned on for a long time and the minute mirror corresponding to the pixel of a low gradation is kept turned off for a long time. This control enables expression of gradation of each color for each minute mirror (each pixel).

A color image is expressed by combining gradations expressed with the times for which the respective minute mirrors are turned on for respective colors for respective frames. As described above, the projection light expressing the image is emitted from the projection lens 18. The projection light is projected on the screen or the like, and thereby the color image is displayed on the screen or the like.

Although the above explanation illustrates an example of the projector using three colors of red light, green light, and blue light, the projector may be configured to emit light of complementary colors such as magenta and yellow and white light to combine them to form an image.

The following is an explanation of the light source apparatus 16 according to the first embodiment of the present invention, which is applied to the projector 1 described above.

Figure 1B:
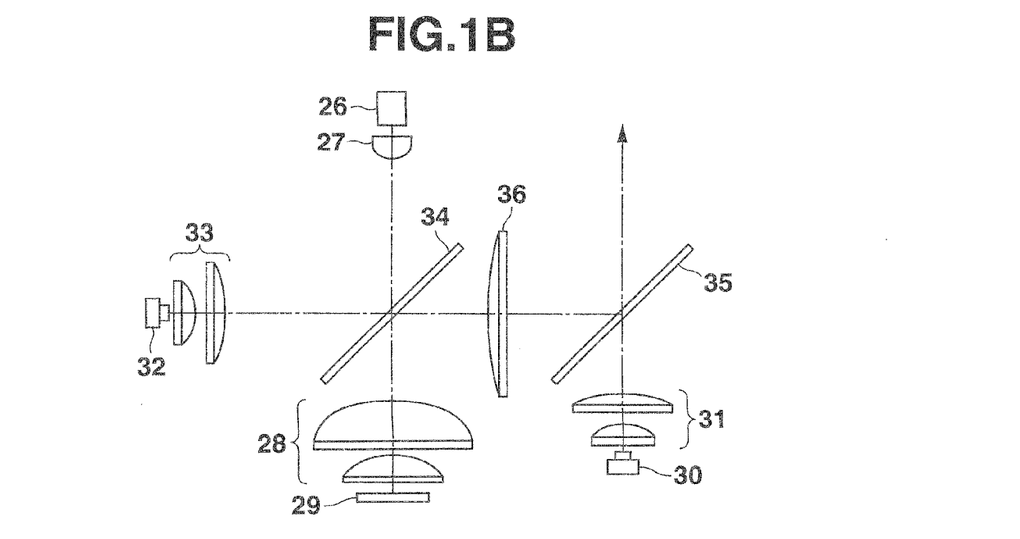
FIG. 1B is a diagram illustrating an outline of an optical structure in a light source apparatus according to the first embodiment of the present invention.

The light source apparatus 16 according to the first embodiment of the present invention includes a green light source device that emits green wavelength band light, a blue light source device that emits blue wavelength band light, a red light source device that emits red wavelength band light, and a light guide optical system that converts the optical axes of the green wavelength band light, the blue wavelength band light, and the red wavelength band light emitted from the green light source device, the blue light source device, and the red light source device into the same optical axis.

Specifically, as illustrated in FIG. 1B, the green light source device includes an excitation light source 26 formed of a semiconductor light emitting device, a collimator lens 27 serving as a condensing lens that converts excitation light emitted from the excitation light source 26 into parallel light, a condensing lens group 28 that condenses the excitation light having been converted into parallel light by the collimator lens 27, and a fluorescent substance plate 29 that is irradiated with the excitation light condensed by the condensing lens group 28.

The excitation light source 26 is a blue LD serving as a semiconductor light emitting device that emits blue wavelength band light. Although FIG. 1B only illustrates one excitation light source 26 and one collimator lens 27, a plurality of blue LDs, for example, 24 blue LDs in three rows and eight columns may be arranged in a matrix, and collimator lenses 27 may be arranged on respective optical axes of the LDs. The condensing lens group 28 also has a function of condensing fluorescent substance emission light that is emitted from the fluorescent substance plate 29.

The fluorescent substance plate 29 is a plate that has a rectangular shape, for example, a square shape, and emits fluorescent substance emission light of a green wavelength band using light emitted from the excitation light source 26 as excitation light. The fluorescent substance plate 29 has a function of receiving the excitation light to emit fluorescent light. The fluorescent substance plate 29 is formed of a material having excellent heat resistance, because the fluorescent substance plate 29 is irradiated with excitation light having high optical energy. Specifically, the fluorescent substance plate 29 is formed by sintering a translucent inorganic material such as $Al_2O_3$ and a plurality of fluorescent substances such as YAG:Ce. The fluorescent substances are scattered, for example, at regular intervals in the translucent inorganic material. The fluorescent substances absorb (are excited by), for example, blue (with a wavelength value in a wavelength range of 455 to 492 nm) excitation light by irradiation with the excitation light, to emit green (with a wavelength value in a wavelength range of 492 to 577 nm) emitted light in all directions.

The blue light source device includes a blue light source 30 that is disposed such that the optical axis of light emitted therefrom is parallel with the optical axis of light emitted from the fluorescent substance plate 29, and a condensing lens group 31 that condenses light emitted from the blue light source 30. The blue light source 30 is a blue LED serving as a semiconductor light emitting device that emits blue wavelength band light.

The red light source device includes a red light source 32 that is disposed such that the optical axis of light emitted therefrom crosses the optical axis of light emitted from the fluorescent substance plate 29 and the optical axis of light emitted from the blue light source 30, and a condensing lens group 33 that condenses light emitted from the red light source 32. The red light source 32 is a red LED serving as a semiconductor light emitting device that emits red wavelength band light.

The light guide optical system includes dichroic mirrors 34 and 35, and a condensing lens 36 disposed between the dichroic mirrors 34 and 35.

The dichroic mirror 34 is disposed in a position where the optical axis of the blue wavelength band light emitted from the excitation light source 26 and the optical axis of the green wavelength band light emitted from the fluorescent substance plate 29 cross the optical axis of the red wavelength band light emitted from the red light source 32. The dichroic mirror 34 has a function of transmitting the blue wavelength band light serving as the excitation light and the red wavelength band light, reflecting the green wavelength band light serving as the fluorescent substance emission light, and converting the optical axis of the green wavelength band light by 90° in the direction of the optical axis of the red wavelength band light, that is, causing the optical axis of the green wavelength band light to match the optical axis of the red wavelength band light. As described above, the dichroic mirror 34 functions as the light guide optical system, and also functions as a separation mirror that separates the excitation light from the fluorescent substance emission light in the green light source device.

The dichroic mirror 35 is disposed in a position where the optical axis of the blue wavelength band light emitted from the blue light source 30 crosses the optical axis of the red wavelength band light emitted from the red light source 32. The dichroic mirror 35 has a function of transmitting the blue wavelength band light, reflecting the green wavelength band light and red wavelength band light, and converting the optical axes of the green wavelength band light and the red wavelength band light by 90° in the direction of the optical axis of the blue wavelength band light.

The light guide optical system as described above converts the optical axes into the same optical axis. Then, as described above, the green wavelength band light, the blue wavelength band light, and the red wavelength band light are successively applied to the mirror 17 via an illumination optical system (not illustrated), and reflected by the mirror 17 to be made incident on the micro mirror element 15.

The following is further explanation of the green light source device in the light source apparatus 16 according to the present embodiment.

Figure 2:
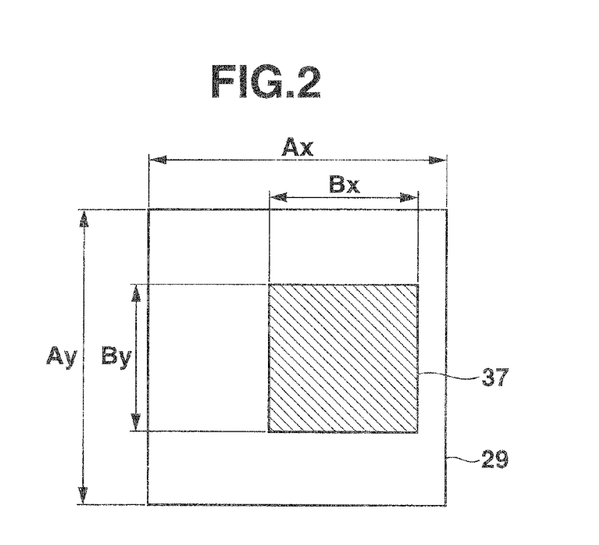
FIG. 2 is a diagram illustrating an excitation light irradiation region for a fluorescent substance plate in the light source apparatus according to the first embodiment.

The condensing lens group 28 is part of a condensing optical system that condenses the excitation light emitted from the excitation light source 26 to an excitation light irradiation region 37 having a rectangular shape, a square shape in this example, that is smaller than the fluorescent substance plate 29, to apply the light to the fluorescent substance plate 29, as illustrated in FIG. 2. In the present embodiment, the condensing optical system such as the condensing lens group 28 is optically designed such that the excitation light irradiation region 37 is eccentric to the fluorescent substance plate 29, specifically, such that the excitation light is applied to dispose the excitation light irradiation region 37 close to one side of the fluorescent substance plate 29. As another example, the fluorescent substance plate 29 is eccentrically disposed to achieve such irradiation state.

This is because the light emission intensity of the fluorescent substance effective emission light serving as fluorescent substance emission light used as illumination light changes when the position of the excitation light irradiation region 37 on the fluorescent substance plate 29 is made eccentric, in the case where the lengths Ax and Ay of the fluorescent substance are sufficiently larger than the lengths Bx and By of the irradiation range.

Figure 3A:
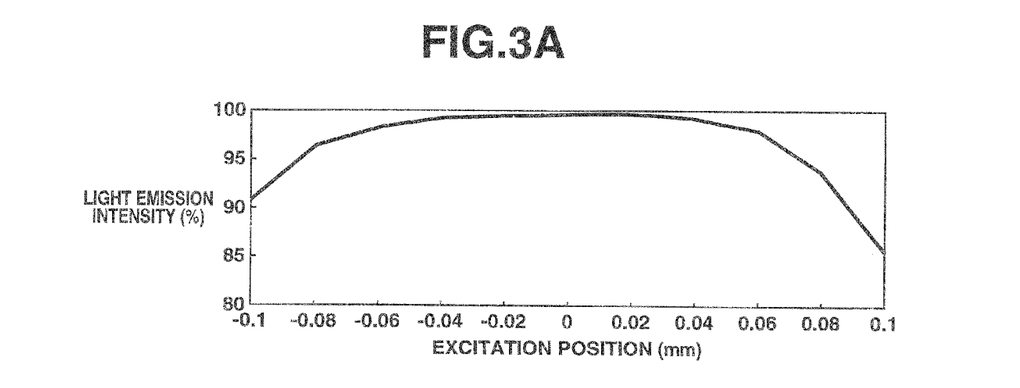
FIG. 3A is a diagram illustrating a relation between the position of the excitation light irradiation region on the fluorescent substance plate and the light emission intensity of fluorescent substance effective emission light, in the case where the lengths of the fluorescent substance plate are 1.33 times as long as the lengths of the excitation light irradiation region.

In the case where the lengths Ax and Ay of the fluorescent substance plate 29 are not so longer than the lengths Bx and By of the excitation light irradiation region 37, for example, the excitation light irradiation region 37 has a size of 0.3 mm×0.3 mm and the fluorescent substance plate 29 has a size of 0.4 mm×0.4 mm (with a thickness of 0.1 mm), that is, the lengths of the fluorescent substance plate 29 are 1.33 times as long as the lengths of the excitation light irradiation region 37, the fluorescent substance effective emission light has higher light emission intensity, that is, brighter in the case where the excitation light irradiation region 37 is disposed in substantially the center of the fluorescent substance plate 29, as illustrated in FIG. 3A.

Figure 3B:
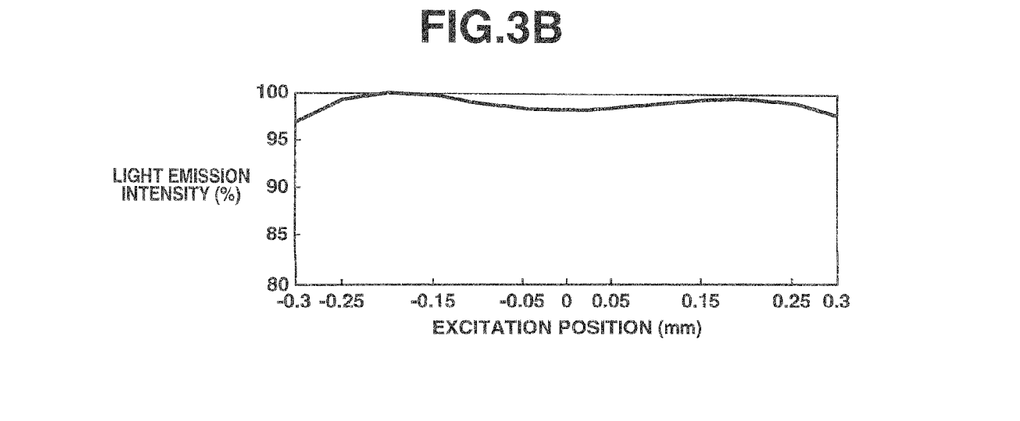
FIG. 3B is a diagram illustrating a relation between the position of the excitation light irradiation region on the fluorescent substance plate and the light emission intensity of fluorescent substance effective emission light, in the case where the lengths of the fluorescent substance plate are twice as long as the lengths of the excitation light irradiation region.

By contrast, in the case where the lengths Ax and Ay of the fluorescent substance plate 29 are sufficiently larger than the lengths Bx and By of the excitation light irradiation region 37, for example, the excitation light irradiation region 37 has a size of 0.3 mm×0.3 mm and the fluorescent substance plate 29 has a size of 0.6 mm×0.6 mm (with a thickness of 0.1 mm), that is, the lengths of the fluorescent substance plate 29 are twice as long as the lengths of the excitation light irradiation region 37, it is determined by experiment that the fluorescent substance effective emission light has higher light emission intensity, that is, is brighter in the case where the excitation light irradiation region 37 is disposed closer to the outline of the fluorescent substance plate 29 in comparison with the case where the excitation light irradiation region 37 is disposed in the center of the fluorescent substance plate 29, as illustrated in FIG. 3B.

Figure 4:
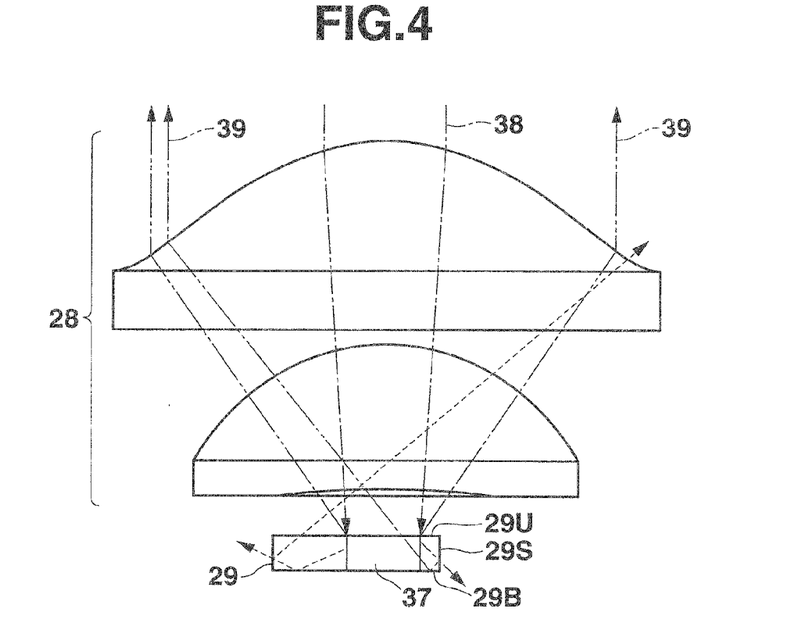
FIG. 4 is a diagram illustrating an outgoing path of fluorescent light in the light source apparatus according to the first embodiment.

As illustrated in FIG. 4, the fluorescent substance emission light that is emitted in all directions from the excitation light irradiation region 37 of the fluorescent substance plate 29 irradiated with the excitation light 38 is propagated through the inside of the fluorescent substance plate 29, and totally reflected by the fluorescent substance plate bottom surface 29B or the fluorescent substance plate side surfaces 29S. In the direction of the above one side of the fluorescent substance plate 29 to which the excitation light irradiation region 37 is disposed close, the fluorescent substance emission light is totally reflected by the fluorescent substance plate side surface 29S with high probability before being reflected by the fluorescent substance plate bottom surface 29B, because the fluorescent substance emission light propagates inside the fluorescent substance plate 29 with a short distance. In addition, such fluorescent substance emission light is totally reflected by the fluorescent substance plate bottom surface 29B after being totally reflected by the fluorescent substance plate side surface 29S, to be propagated through the excitation light irradiation region 37 and emitted from the fluorescent substance plate upper surface 29U at the position of the excitation light irradiation region 37 or near the position, as illuminant effective emission light 39 within the taking range of the condensing lens group 28. As described above, part of fluorescent substance emission light that undesirably serves as fluorescent substance ineffective emission light 40 when the lengths Ax and Ay of the fluorescent substance are sufficiently larger than the lengths Bx and By of the irradiation range can be used as illuminant effective emission light 39, to reduce loss of fluorescent substance emission light, by achieving an eccentric irradiation state such that the excitation light irradiation region 37 is disposed closer to one side of the fluorescent substance plate 29.

As described above, the light source apparatus 16 according to the present embodiment has the condensing optical system including the condensing lens group 28 that applies the excitation light 38 emitted from the excitation light source 26 to the fluorescent substance plate 29 such that the light is condensed to the excitation light irradiation region 37 having a rectangular shape smaller than the rectangular fluorescent substance plate 29, and takes in the fluorescent substance emission light from the excitation light irradiation region 37. Because the excitation light 38 is applied such that the rectangular excitation light irradiation region 37 is eccentric to the fluorescent substance plate 29, loss of the fluorescent substance emission light can be reduced, even when the size of the fluorescent substance plate 29 is sufficiently larger than the size of the excitation light irradiation region 37.

This structure enables acquisition of sufficient illumination light equal to that in the case of forming the fluorescent substance plate 29 with a small size. This structure thus enables to use fluorescent substance plate 29 with a large size, and facilitates handling in mounting. In addition, because fluorescent substance plate 29 with a large size has portions other than the excitation light irradiation region 37 that are not irradiated with excitation light 38, the portions are expected to have a cooling effect.

Eccentric irradiation in the excitation light irradiation region 37 having such a rectangular shape is effective when the size of the rectangular fluorescent substance plate 29 has a predetermined ratio to the size of the excitation light irradiation region 37. When the size of the fluorescent substance plate 29 is smaller than the predetermined ratio, the excitation light irradiation region 37 should be located in the center of the fluorescent substance plate 29 without eccentricity, in view of the experiment results of FIG. 3A. For example, because the example of FIG. 3A illustrates the case where the ratio is 1.33, the predetermined ratio is set to 1.4. The predetermined ratio is determined based on the actual size of the fluorescent substance plate 29, the size of the excitation light irradiation region 37, and the optical design of the condensing optical system including the condensing lens group 28, and not limited to 1.4 described above.

[Modification]

Generally, because the fluorescent substance plate 29 is disposed on a substrate that is not illustrated, the fluorescent substance plate bottom surface 29B has an optical total reflection property. By contrast, the fluorescent substance plate side surfaces 29S serving as cut portions have such total reflection property to a certain degree, although nothing is disposed thereon. For this reason, part of the fluorescent substance emission light emitted from the excitation light irradiation region 37 or reflected by the fluorescent substance plate bottom surface 29B is reflected by the fluorescent substance plate side surfaces 29S, and the rest of the fluorescent substance emission light outgoes from the fluorescent substance plate side surfaces 29S to the outside of the fluorescent substance plate 29, and represents a loss.

Figure 5:
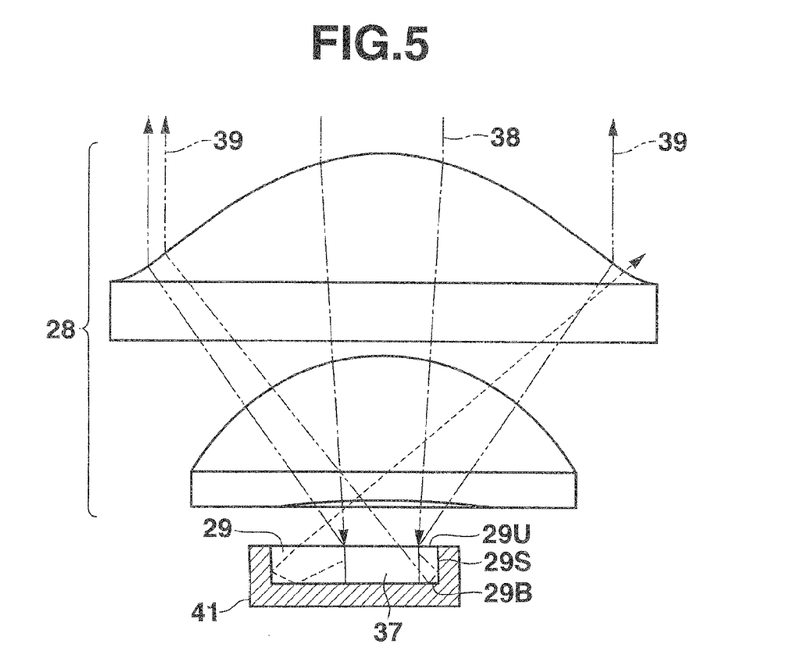
FIG. 5 is a diagram illustrating an outgoing path of fluorescent light in a modification of the light source apparatus according to the first embodiment.

To prevent the loss, as illustrated in FIG. 5, it is more preferable to form a reflection structure 41 such as a reflection film on the surfaces of the fluorescent substance plate 29 other than the fluorescent substance plate upper surface 29U serving as the excitation light incident surface, to prevent the fluorescent substance emission light emitted from the excitation light irradiation region 37 or reflected by the fluorescent substance plate bottom surface 29B from outgoing from the fluorescent substance plate side surfaces 29S to the outside of the fluorescent substance plate 29.

Second Embodiment

A second embodiment will be explained hereinafter. The following explanation illustrates a difference thereof from the first embodiment, and explanation of constituent elements that are the same as those in the first embodiment is omitted where the same reference numerals are used.

Figure 6:
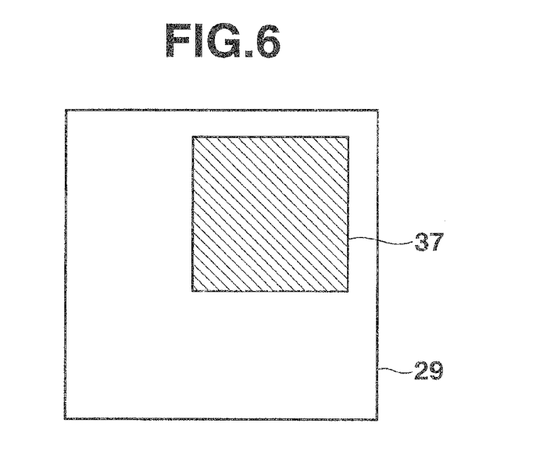
FIG. 6 is a diagram illustrating an excitation light irradiation region for a fluorescent substance plate in a light source apparatus according to a second embodiment of the present invention.

The first embodiment has the structure in which excitation light 38 is applied such that the rectangular excitation light irradiation region 37 is disposed close to one side of the rectangular fluorescent substance plate 29. As illustrated in FIG. 6, the present embodiment has the structure in which excitation light 38 is applied such that the excitation light irradiation region 37 is disposed close to two sides of the fluorescent substance plate 29 at equal distances, that is, close to one corner of the fluorescent substance plate 29.

This structure enables use of fluorescent substance emission light reflected from the fluorescent substance plate side surfaces 29S at the two sides of the fluorescent substance plate 29 as illuminant effective emission light 39, and thus enables more reduction in loss of the fluorescent substance emission light than in the first embodiment.

Third Embodiment

A third embodiment will be explained hereinafter. The following explanation illustrates a difference thereof from the first embodiment, and explanations of constituent elements that are the same as those in the first embodiment are omitted where the same reference numerals are used.

Figure 7A:
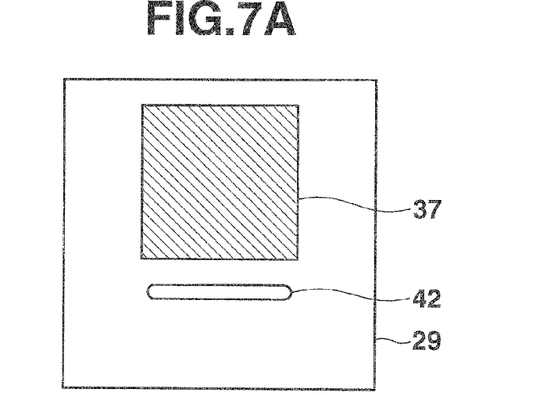
FIG. 7A is a diagram illustrating an excitation light irradiation region for a fluorescent substance plate in a light source apparatus according to a third embodiment of the present invention.

The first embodiment has the structure in which excitation light 38 is applied such that the rectangular excitation light irradiation region 37 is disposed close to one side of the rectangular fluorescent substance plate 29. As illustrated in FIG. 7A, the present embodiment has the structure in which the fluorescent substance plate 29 is provided with an air slit 42. The air slit 42 extends along one side of the rectangular excitation light irradiation region 37 and disposed in a position close to the one side. The one side is opposed to side to which the rectangular excitation light irradiation region 37 is disposed close to the above one side of the fluorescent substance plate 29 when the excitation light is applied as described above.

The air slit 42 provided as described above produces the same effect as that in the case of applying the excitation light 38 such that the excitation light irradiation region 37 is disposed close to one side of the fluorescent substance plate 29, because the wall of the air slit 42 located to face the excitation light irradiation region 37 totally reflects the fluorescent substance emission light to a certain degree like the fluorescent substance plate side surfaces 29S. This structure enables use of the fluorescent substance emission light reflected by the fluorescent substance plate side surfaces 29S of the fluorescent substance plate 29 and the wall of the air slit 42 as illuminant effective emission light 39, and enables more reduction in loss of the fluorescent substance emission light than in the first embodiment.

[Modification]

Figure 7B:
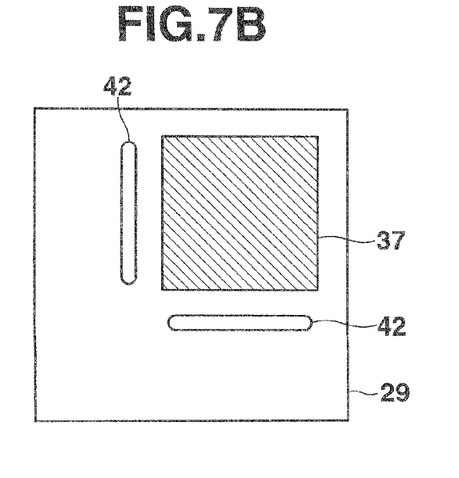
FIG. 7B is a diagram illustrating an excitation light irradiation region for a fluorescent substance plate in a modification of the light source apparatus according to the third embodiment.

In the case where the excitation light 38 is applied such that the excitation light irradiation region 37 is disposed close to one corner of the fluorescent substance plate 29 as in the second embodiment, the fluorescent substance plate 29 may be provided with air slits 42, as illustrated in FIG. 7B. The air slits 42 are provided close to, and extend along, two respective sides of the rectangular excitation light irradiation region 37. The two sides of the excitation light irradiation region 37 are not disposed close to the above two sides of the rectangular fluorescent substance plate 29 when excitation light 38 is applied. This structure enables more reduction in loss of the fluorescent substance emission light than in the second embodiment.

Figure 7C:
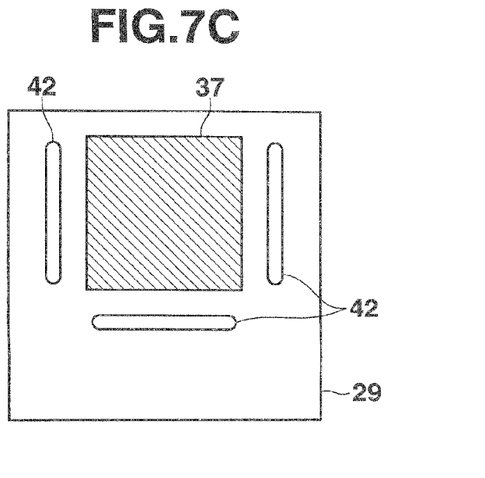
FIG. 7C is a diagram illustrating an excitation light irradiation region for a fluorescent substance plate in another modification of the light source apparatus according to the third embodiment.

In the case where the excitation light 38 is applied such that the excitation light irradiation region 37 is disposed close to one side of the fluorescent substance plate 29 as in the first embodiment, the fluorescent substance plate 29 may be provided with air slits 42, as illustrated in FIG. 7C. The air slits 42 are provided close to, and extend along, three respective sides of the rectangular excitation light irradiation region 37. The three sides of the excitation light irradiation region 37 are not disposed close to the above one side of the rectangular fluorescent substance plate 29 when excitation light 38 is applied. This structure enables more reduction in loss of the fluorescent substance emission light than in the third embodiment.

As described above, the light source apparatus 16 according to the third embodiment and the modifications thereof further includes one or more air slits 42 disposed close to, and extending along, at least one side of the rectangular excitation light irradiation region 37 that is not disposed close to the sides of the rectangular fluorescent substance plate 29, and thus enables more reduction in loss of the fluorescent substance emission light.

It is explained in the first embodiment that the excitation light irradiation region 37 should be located in the center of the fluorescent substance plate 29 without eccentricity when the size of the rectangular fluorescent substance plate 29 is smaller than the predetermined ratio to the size of the excitation light irradiation region 37. Also in the case of applying the excitation light to the center of the fluorescent substance plate 29, loss of the fluorescent substance emission light can be reduced as a matter of course, by providing the fluorescent substance plate 29 with air slits 42 disposed close to, and extending along, the four respective sides of the rectangular excitation light irradiation region 37 in the same manner as the present embodiment.

Although the present invention has been explained above using embodiments, the present invention is not limited to the above embodiments, but can be carried out by modifying the constituent elements thereof within a range not departing from the gist thereof.

For example, a homogenizer may be disposed at the stage following the collimator lens, to convert a bundle of rays of excitation light having a Gaussian intensity distribution into a bundle of rays having a top hat type uniform intensity distribution, and then apply the excitation light to the fluorescent substance plate.

Although the above embodiments illustrate the present invention using the example in which each of the fluorescent substance plate and the excitation light irradiation region has a rectangular shape, the present invention is not limited to the above embodiments. Because the cause of loss of emitted light is the same even in the case where each of the fluorescent substance plate and the excitation light irradiation region has, for example, a circular shape, the present invention produces an effect as a matter of course since the excitation light irradiation region is disposed to be eccentric to the fluorescent substance plate.

Various inventions can be made by proper combinations of constituent elements disclosed in one of the embodiments. For example, a structure obtained by removing some of the constituent elements disclosed in one of the embodiments can be extracted as an invention, as long as the structure can solve the problem described in the problems to be solved by the invention and can produce the effect of the invention. In addition, constituent elements of different embodiments may be properly used in combination.

For example, the light source apparatus 16 according to the present invention can be used as a light source of various apparatuses such as illumination apparatuses, as well as the projector 1.

What is claimed is:

1. A light source apparatus comprising:
    an excitation light source configured to emit excitation light;
    a fluorescent substance plate configured to be excited by the excitation light, and to emit fluorescent substance light having a wavelength different from a wavelength of the excitation light, the fluorescent substance plate being formed by sintering a translucent inorganic material and a plurality of fluorescent substances; and
    a condensing optical system configured to condense the excitation light emitted from the excitation light source to an excitation light irradiation region that is smaller than the fluorescent substance plate, to apply the excitation light to the fluorescent substance plate, and to take in fluorescent substance emission light from the excitation light irradiation region,
    wherein the excitation light is applied to the fluorescent substance plate such that the excitation light irradiation region is eccentric to the fluorescent substance plate.

2. The light source apparatus according to claim 1, wherein the fluorescent substance plate has a size having a predetermined ratio or more to a size of the excitation light irradiation region.

3. The light source apparatus according to claim 1, wherein:
    the excitation light irradiation region has a rectangular shape, and the fluorescent substance plate has a rectangular shape, and
    the rectangular excitation light irradiation region is disposed close to one side of the rectangular fluorescent substance plate.

4. The light source apparatus according to claim 2, wherein:
    the excitation light irradiation region has a rectangular shape, and the fluorescent substance plate has a rectangular shape, and
    the rectangular excitation light irradiation region is disposed close to one side of the rectangular fluorescent substance plate.

5. The light source apparatus according to claim 1, wherein:
    the excitation light irradiation region has a rectangular shape, and the fluorescent substance plate has a rectangular shape, and
    the rectangular excitation light irradiation region is disposed close to two sides of the rectangular fluorescent substance plate at equal distances.

6. The light source apparatus according to claim 2, wherein:
    the excitation light irradiation region has a rectangular shape, and the fluorescent substance plate has a rectangular shape, and
    the rectangular excitation light irradiation region is disposed close to two sides of the rectangular fluorescent substance plate at equal distances.

7. A projector which receives an image and projects the image on a projection object, comprising:
    the light source apparatus according to claim 1;
    a display element configured to perform display of the image using light emitted from the light source apparatus;
    a projection optical system configured to project the image displayed on the display element on the projection object; and
    a control unit configured to control the light source apparatus and the display element.

8. A light source apparatus comprising:
    an excitation light source configured to emit excitation light;
    a fluorescent substance plate configured to be excited by the excitation light, and to emit fluorescent substance light having a wavelength different from a wavelength of the excitation light; and
    a condensing optical system configured to condense the excitation light emitted from the excitation light source to an excitation light irradiation region that is smaller than the fluorescent substance plate, to apply the excitation light to the fluorescent substance plate, and to take in fluorescent substance emission light from the excitation light irradiation region,
    wherein:
    the excitation light is applied to the fluorescent substance plate such that the excitation light irradiation region is eccentric to the fluorescent substance plate,
    the excitation light irradiation region has a rectangular shape, and the fluorescent substance plate has a rectangular shape,
    the rectangular excitation light irradiation region is disposed close to one side of the rectangular fluorescent substance plate, and
    the light source apparatus further comprises an air slit provided in the fluorescent substance plate, the air slit being disposed close to, and extending along, at least one side of the rectangular excitation light irradiation region, the at least one side of the rectangular excitation light irradiation region not being disposed close to the one side of the rectangular fluorescent substance plate.

9. A projector which receives an image and projects the image on a projection object, comprising:
the light source apparatus according to claim 8;
a display element configured to perform display of the image using light emitted from the light source apparatus;
a projection optical system configured to project the image displayed on the display element on the projection object; and
a control unit configured to control the light source apparatus and the display element.

10. A light source apparatus comprising:
an excitation light source configured to emit excitation light;
a fluorescent substance plate configured to be excited by the excitation light, and to emit fluorescent substance light having a wavelength different from a wavelength of the excitation light; and
a condensing optical system configured to condense the excitation light emitted from the excitation light source to an excitation light irradiation region that is smaller than the fluorescent substance plate, to apply the excitation light to the fluorescent substance plate, and to take in fluorescent substance emission light from the excitation light irradiation region,
wherein:
the excitation light is applied to the fluorescent substance plate such that the excitation light irradiation region is eccentric to the fluorescent substance plate,
the excitation light irradiation region has a rectangular shape, and the fluorescent substance plate has a rectangular shape,
the rectangular excitation light irradiation region is disposed close to two sides of the rectangular fluorescent substance plate at equal distances, and
the light source apparatus further comprises an air slit provided in the fluorescent substance plate, the air slit being disposed close to, and extending along, at least one side of the rectangular excitation light irradiation region, the at least one side of the rectangular excitation light irradiation region not being disposed close to one of the two sides of the rectangular fluorescent substance plate.

11. A projector which receives an image and projects the image on a projection object, comprising:
the light source apparatus according to claim 10;
a display element configured to perform display of the image using light emitted from the light source apparatus;
a projection optical system configured to project the image displayed on the display element on the projection object; and
a control unit configured to control the light source apparatus and the display element.

* * * * *